United States Patent
Zhou

(10) Patent No.: US 10,650,789 B2
(45) Date of Patent: *May 12, 2020

(54) METHOD AND APPARATUS FOR CONTROLLING DISPLAY SCREEN STATUSES

(71) Applicant: Guangdong Oppo Mobile Telecommunications Corp., Ltd., Dongguan, Guangdong (CN)

(72) Inventor: Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,608

(22) Filed: Sep. 23, 2019

(65) Prior Publication Data

US 2020/0020305 A1 Jan. 16, 2020

Related U.S. Application Data

(63) Continuation of application No. 15/792,753, filed on Oct. 25, 2017.

(30) Foreign Application Priority Data

Feb. 14, 2017 (CN) .......................... 2017 1 0078761

(51) Int. Cl.
*G09G 5/30* (2006.01)
*G01S 17/88* (2006.01)
(Continued)

(52) U.S. Cl.
CPC .............. *G09G 5/30* (2013.01); *G01S 7/4811* (2013.01); *G01S 7/4813* (2013.01);
(Continued)

(58) Field of Classification Search
CPC ...... G01S 17/32; G01S 17/026; G01S 7/4813; G01S 17/48; G01S 7/4814; G01S 7/4816; G01S 7/497
See application file for complete search history.

(56) References Cited

U.S. PATENT DOCUMENTS

2013/0062521 A1 3/2013 Hirayama
2013/0155041 A1 6/2013 Yanai
(Continued)

FOREIGN PATENT DOCUMENTS

CN 102645654 A 8/2012
CN 103067939 A 4/2013
(Continued)

OTHER PUBLICATIONS

Extended European search report issued in corresponding European application No. 17198753.0 dated Apr. 10, 2018.
(Continued)

*Primary Examiner* — Luke D Ratcliffe
(74) *Attorney, Agent, or Firm* — Young Basile Hanlon & MacFarlane, P.C.

(57) ABSTRACT

Provided are a method and apparatus for controlling display screen statuses. The method includes the following. A detection signal is transmitted by a signal emitter. A proximity light reflection signal of the detection signal reflected by an external object is received by a first signal receiver and a distant light reflection signal of the detection signal reflected by the external object is received by a second signal receiver. Intensity of the reflection signal received by the first signal receiver is compared with a first threshold to obtain a first comparison result. Intensity of the reflection signal received by the second signal receiver is compared with a second threshold to obtain a second comparison result. Control
(Continued)

statuses of the display screen according to the first comparison result and the second comparison result.

18 Claims, 10 Drawing Sheets

(51) Int. Cl.
| | |
|---|---|
| *G01S 17/00* | (2020.01) |
| *G01S 7/481* | (2006.01) |
| *G06F 1/3231* | (2019.01) |
| *G06F 1/3234* | (2019.01) |
| *G06F 3/042* | (2006.01) |
| *G01S 17/04* | (2020.01) |
| *G09G 1/16* | (2006.01) |
| *G09G 5/00* | (2006.01) |
| *G06F 3/14* | (2006.01) |

(52) U.S. Cl.
CPC .......... *G01S 17/003* (2013.01); *G01S 17/04* (2020.01); *G01S 17/88* (2013.01); *G06F 1/3231* (2013.01); *G06F 1/3265* (2013.01); *G06F 3/0421* (2013.01); *G09G 1/165* (2013.01); *G09G 5/001* (2013.01); *G06F 3/1407* (2013.01)

(56) References Cited

U.S. PATENT DOCUMENTS

| | | | |
|---|---|---|---|
| 2016/0113585 A1 | 4/2016 | Uedaira et al. | |
| 2016/0146938 A1* | 5/2016 | Becker | G01S 17/32 |
| | | | 250/208.2 |

FOREIGN PATENT DOCUMENTS

| | | |
|---|---|---|
| CN | 103165069 A | 6/2013 |
| CN | 103945026 A | 7/2014 |
| CN | 104092836 A | 10/2014 |
| CN | 105246045 A | 1/2016 |
| CN | 105407191 A | 3/2016 |
| CN | 105976790 A | 9/2016 |
| CN | 106210356 A | 12/2016 |
| CN | 106385511 A | 2/2017 |

OTHER PUBLICATIONS

International search report issued in corresponding international application No. PCT/CN2017/108151 dated Jan. 16, 2018.

* cited by examiner

METHOD AND APPARATUS FOR CONTROLLING DISPLAY SCREEN STATUSES

CROSS-REFERENCE TO RELATED APPLICATION(S)

This application is a continuation of U.S. patent application Ser. No. 15/792,753, filed on Oct. 25, 2017, which claims priority to Chinese Patent Application No. 201710078761.2, filed on Feb. 14, 2017, the contents of both of which are incorporated herein by reference in their entireties.

TECHNICAL FIELD

The present disclosure relates to a technical field of terminals, and more particularly to a method and apparatus for controlling display screen statuses.

BACKGROUND

With rapid developments of terminal technology, intelligent terminals are more and more popular, and have become important devices in lives of people. People learn and are entertained by the intelligent terminals.

Determination of a proximate state or distant state between the intelligent terminals and an external object, for controlling on and off states of display screens of the intelligent terminals, is a necessary function of the intelligent terminals. The intelligent terminals detect the proximate state and distant state between the intelligent terminals using an infrared emitter and an infrared receiver. The infrared emitter emits infrared light, and an object reflects the infrared light to form reflected light. After the infrared receiver receives the reflected light, the proximate state and distant state of the intelligent terminals are determined, based on intensity of the reflected light.

However, in actual use of the intelligent terminals, long distance between the infrared emitter and the infrared receiver causes reception failure of the reflected light to the infrared receiver, when the external object approaches the intelligent terminals. When the infrared emitter and the infrared receiver are too close each other, and the intelligent terminals are far away from the external object, part of the infrared light emitted by the infrared emitter can directly enter the infrared receiver due to diffraction of the infrared light inside the intelligent terminals, so that the infrared receiver has a large basic value regarding the detection. Since the external object is away from the infrared receiver, small intensity changes of the reflected light can be detected by the infrared receiver after the reflected light enters the infrared receiver. Therefore, sensitivity of the infrared receiver is very low, which will cause errors or detection omissions, thereby causing inaccurate control of on and off states of the display screens of the intelligent terminals.

DETAILED DESCRIPTION

Figure 1:
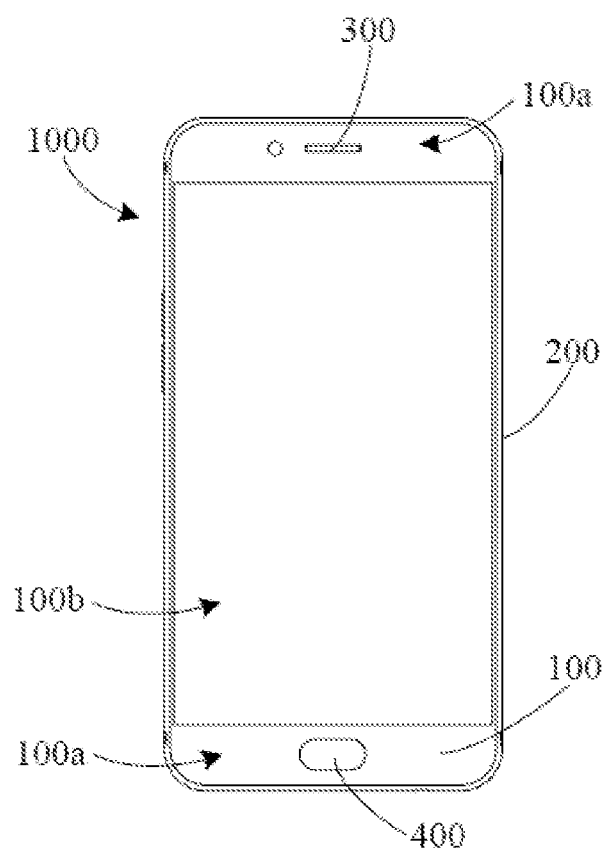
FIG. 1 illustrates a structural diagram of a mobile terminal according to one embodiment of the present disclosure.

The following embodiments refer to the accompanying drawings for illustrating specific implementable embodiments of the present disclosure in a suitable computing environment. It should be noted that the described example embodiments are configured to describe and understand the present disclosure, but the present disclosure is not limited thereto.

In the descriptions of the present disclosure, the terms "center", "longitudinal", "lateral", "length", "width", "thickness", "upper", "lower", "front", "back", "left", "right", "vertical", "horizontal", "top", "bottom", "inner", "outer", "clockwise", "counterclockwise" directions, and other indicated directions or the position relation are based on the orientation or position relation shown in the figures. Only for convenience of describing the present disclosure and the simplification of the description, rather than indicating or implying that the means or elements referred to have a specific orientation, so that the above directions of the present disclosure cannot be understood as limitations. In addition, the terms "first" and "second" are used only for purposes of description, and cannot be understood to indicate or imply a relative importance or to implicitly indicate the number of technical features indicated. Thus, the features "first" and "second" can be expressly or implicitly included in one or more of the features. In the description of the present disclosure, the meanings of "multiple" are two or more, unless specifically limited otherwise.

In the descriptions of the present disclosure, it should be noted that unless explicitly stated and defined otherwise, the terms "installing", "connecting", and "connecting" should be construed broadly. For example, the connecting device can be fixedly connected, detachably connected, mechanically connected, electrically connected, in mutual communication with each other, directly connected or indirectly connected through an intermediate medium. The interaction relationship between the two elements in the two elements can be the interaction relationship of the two elements. For a person of ordinary skill in the art, the specific meaning of the terms in the present disclosure can be understood according to specific situations.

In the present disclosure, unless explicitly stated and defined otherwise, the first feature can be in direct contact with the first feature if the first feature is arranged "on" or "under" the second feature. The first and second features may also include first and second features that are not in direct contact but are in contact with each other through additional features. That the first feature is "above" the second feature mean that the first feature is arranged right above or obliquely upward the second feature. Also, only the height of the first feature is greater than that of the second feature. That the first feature is "below" the second feature mean that the first feature is arranged right below or obliquely downward the second feature. Also, only the height of the first feature is less than that of the second feature.

The following disclosure provides many different embodiments or examples for implementing different structures of the present disclosure. In order to simplify the disclosure of the present disclosure, components and arrangements of specific examples are described below. It should be noted that they are merely examples and are not intended to limit the present disclosure. In addition, reference numerals and/or reference letters can be repeated in different examples. The repetition is for the purpose of simplicity and clarity and does not means the relationship between the various embodiments and/or arrangements discussed. In addition, the present disclosure provides examples of various specific processes and materials. The other processes and/or the use of other materials can be recognized by person skilled in the art.

FIG. 1 is an illustrative structural diagram of a mobile terminal 1000 according to one embodiment of the present disclosure. The mobile terminal 1000 is an electronic device, such as a mobile phone or a tablet computer, but the mobile terminal 1000 is not limited thereto.

The mobile terminal 1000 includes a panel assembly 100 and a housing 200. The panel assembly 100 is arranged on and connected with the housing 200. The mobile terminal 1000 further includes a telephone receiver. A non-display region 100a of the panel assembly 100 includes an opening 300 to transmit sound for the telephone receiver. The mobile terminal 1000 further includes a fingerprint identification unit 400. The fingerprint identification unit 400 is arranged on the non-display region 100a of the panel assembly 100. A display region 100b of the panel assembly 100 can be used for displaying images or for user touch operations.

In one embodiment, the panel assembly 100 is selected from a group consisting of a touch panel assembly, a panel assembly, and a mobile terminal panel assembly having different functions.

Figure 2:
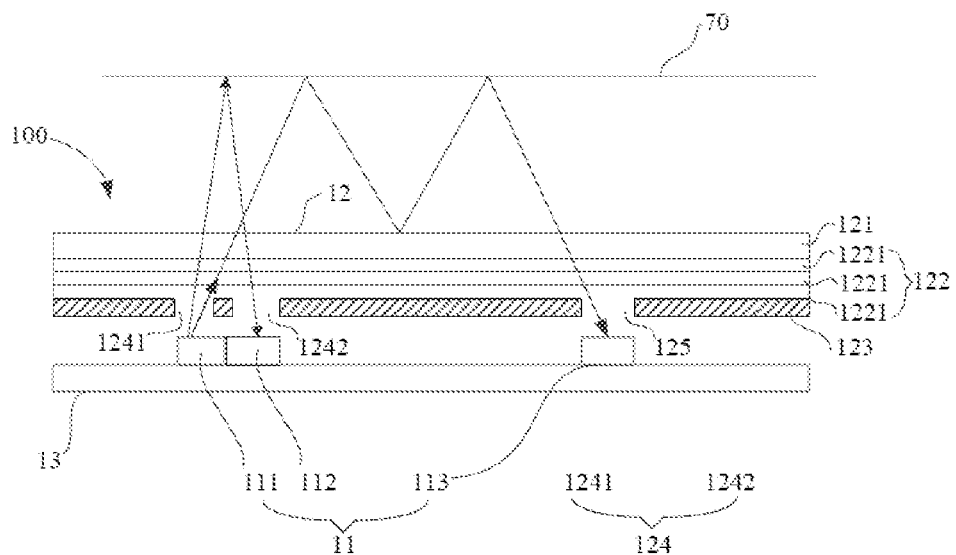
FIG. 2 illustrates a first structural diagram of a panel assembly according to one embodiment of the present disclosure.

FIG. 2 illustrates a first structural diagram of the panel assembly 100 according to one embodiment of the present disclosure. The panel assembly 100 includes a sensor unit 11, a cover plate assembly 12, and a control circuit 13. The sensor unit 11 is arranged on one side of an inner surface of the cover plate assembly 12. The sensor unit 11 and the cover plate assembly 12 are separately arranged. The control circuit 13 is in communication with the sensor unit 11 and the cover plate assembly 12. For example, the control circuit 13 is a main circuit board, and the sensor unit 11 is fixedly arranged on the main circuit board.

In one embodiment, the sensor unit 11 includes a first signal emitter 111, a first signal receiver 112, and a second signal receiver 113.

The first signal emitter 111 emits signals outwardly, which are reflected by an external object. The first signal receiver 112 and the second signal receiver 113 are configured to receive reflection signals reflected by the external object.

In one embodiment, the signals can be light signals, such as infrared rays and lasers. The signals can also be sound wave signals, such as ultrasonic waves. For example, the signals are defined as light signals, the signal emitter is defined as a light emitter, and the signal receiver is defined as a light receiver.

In embodiments of the present disclosure, the first light emitter 111 (e.g., an infrared emitter) is used for emitting detection light, and a wavelength of the detection light is greater than 850 nm. For example, the first light emitter 111 is an infrared light emitting diode (LED).

Correspondingly, the first light receiver 112 (e.g., an infrared receiver) is used for receiving a proximity light signal that is formed by reflecting the detection light off a blocking object 70. For example, the blocking object 70 is defined as a human face in a scene where the mobile terminal is close to or away from the human face in a communication process.

Correspondingly, the second light receiver 113 (e.g., an infrared receiver) is used for receiving a distant light signal that is formed by reflecting the detection light off the blocking object 70.

The proximity light signal means that the first light receiver 112 is close to the first light emitter 111, where the first light receiver 112 receives a reflected detection light from the blocking object 70. The distant light signal means that the second light receiver 113 is away from the first light emitter 111, where the second light receiver 113 receives the reflected detection light from the blocking object 70.

A distance between the first light receiver 112 and the first light emitter 111 is less than a distance between the second light receiver 113 and the first light emitter 111. When the cover plate assembly 12 is away from the blocking object 70, light intensity change detection of the second light receiver 113 is more sensitive. When the cover plate assembly 12 is close to the blocking object 70, the light intensity change detection of the first light receiver 112 is more sensitive. Therefore, the mobile terminal 1000 determines whether the mobile terminal 1000 is away from or close to the blocking object 70 based on the light intensity of the reflected detection light received by the first light receiver 112 and the second light receiver 113, so that determination accuracy and user experience of the mobile terminal 1000 are improved.

In one embodiment, the first light emitter 111 and the first light receiver 112 can be integrated in a first integrated chip that forms a two-in-one chip. In another embodiment, the first light emitter 111 and the first light receiver 112 are arranged by two separated independent chips.

In one embodiment, the cover plate assembly 12 includes a cover plate 121, a first attachment layer 122 on an inner surface of the cover plate 121, and a second attachment layer 123 that is arranged on a surface of the first attachment layer 122 and away from the cover plate 121. The first attachment layer 122 completely covers the second attachment layer 123, where the first attachment layer 122 and the second attachment layer 123 form an attachment layer.

In one embodiment, the first attachment layer 122 and the second attachment layer 123 are configured to achieve the effect of hiding internal structural members and the second attachment layer 123 of the mobile terminal 1000. In other words, when viewing an outer side of the cover plate 121, the user only sees the first attachment layer 122, and cannot view the second attachment layer 123.

In one embodiment, the cover plate 121 is a transparent glass cover plate. For example, the cover plate 121 is a glass cover plate made of a material, such as sapphire and the like.

In one embodiment, the attachment layer can be an ink layer or a coating that is formed by other materials. For example, the attachment layer is an ink layer, the first attachment layer is a light-transmitting ink layer, and the second attachment layer is a light-shading ink layer.

In one embodiment, the light-transmitting ink layer 122 is a transparent ink layer for transmitting the light. Light transmittance of the ink layer can be set according to different requirements. For example, the transmittance of visible light (e.g., visible light having a wavelength of 550 nm) of the light-transmitting ink layer 122 has a range from 2% to 10%. The transmittance of the light signal (e.g., infrared rays having a wavelength of 850 nm) of a proximity sensor is greater than or equal to 80%.

In one embodiment, the light-transmitting ink layer 122 includes a plurality of light-transmitting ink sub-layers 1221. For example, the light-transmitting ink layer 122 includes three light-transmitting ink sub-layers 1221, where each of the light-transmitting ink sub-layers 1221 is formed by spraying or printing white ink. It should be noted that the light-transmitting ink layer 122 can be designed into other colors according to different aesthetic requirements besides the white ink.

In one embodiment, the light-shading ink layer 123 is an ink layer capable of shading light and shields most of light rays. The light-shading ink layer 123 is formed by spraying or printing black ink. The light-shielding ink layer 123 includes a first region and a second region. Transmission rate of the first region to light rays is greater than that of the second region to the light rays. For example, the first region is a light transmitting area and transmits most of the light rays. The second region is a light shielding area and shields most of the light rays.

The light-transmitting ink layer 122 covers the first region on the light-shielding ink layer 123.

The transmission rate of the light-transmitting ink layer 122 to the light rays is greater than that of the light-shielding ink layer 123.

In embodiments, the transmission rate is selected from a group consisting of a transmission rate of infrared rays, a transmission rate of lasers, and a transmission rate of visible light.

In embodiments, a first light through-hole 124 and a second light through-hole 125 are formed on the light-shielding ink layer 123 and transmit light. The first light through-hole 124 and the second light through-hole 125 are defined as the first region. An area outside the first light through-hole 124 and the second light through-hole 125 in the light-shielding ink layer 123 is defined as the second region. It should be noted that the first light through-hole 124 and the second light through-hole 125 can also be filled with light-transmitting material, where color of the light-transmitting material is the same as color of the light-transmitting ink layer 122. In one embodiment, the first light through-hole 124 includes a first light-emitting hole 1241 and a first light-receiving hole 1242 that separates from the first light-emitting hole 1241. The first light emitter 111 is arranged opposite the first light-emitting hole 1241, and outwardly emits the detection light through the first light-emitting hole 1241. The first light receiver 112 is arranged opposite the first light-receiving hole 1242, and receives reflected detection light by the first light-receiving hole 1242.

In one embodiment, the second light through-hole 125 is arranged opposite the second light receiver 113, and the second light receiver 113 receives reflected detection light by the second light through-hole 125.

Shapes of the first light-emitting hole 1241, the first light-receiving hole 1242, and the second light through-hole 125 can be set according to actual requirements. For example, the shapes are selected from a group consisting of a circle, a rectangle, and a rounded rectangle. In embodiments, for increasing the capability of receiving light signals by the first light receiver 112 and the second light receiver 113, and for improving sensitivity of the sensor, an opening area of the first light-receiving hole 1242 and an opening area of the second light through-hole 125 are greater than an opening area of the first light-emitting hole 1241.

Figure 3:
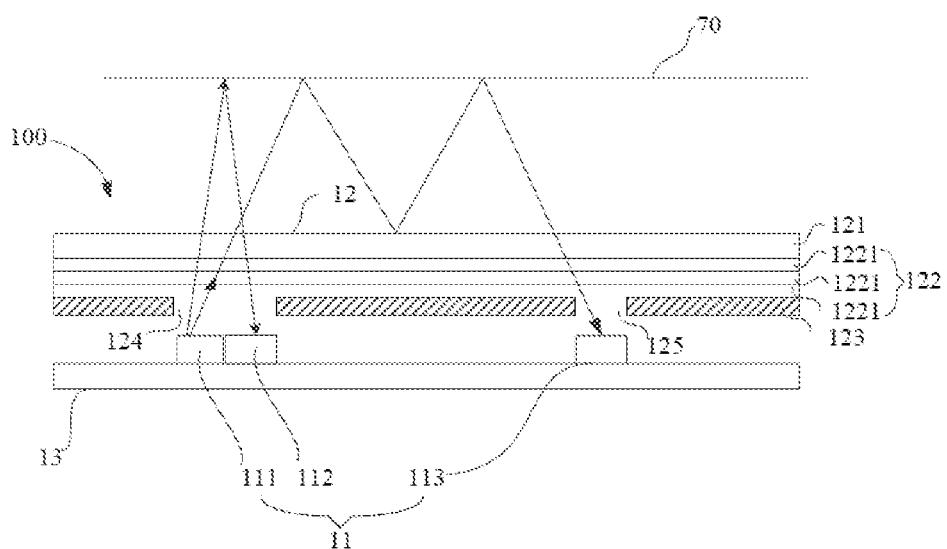
FIG. 3 illustrates a second structural diagram of the panel assembly according to one embodiment of the present disclosure.

In one embodiment, as shown in FIG. 3, the first light through-hole 124 is a larger hole, where the larger hole is used by the first light emitter 111 and the first light receiver 112.

In one embodiment, the control circuit 13 is in communication with the first light emitter 111, the first light receiver 112, and the second light receiver 113. The first light emitter 111, the first light receiver 112, and the second light receiver 113 are all fixedly arranged on the main circuit board.

For example, when a mobile phone uses the panel assembly 100, the distance between the first light receiver 112 and the first light emitter 111 is different from the distance between the second light receiver 113 and the first light emitter 111, where the first light receiver 112 is close to the first light emitter 111. When the panel assembly 100 is close to the blocking object 70, and the second light receiver 113 is away from the first light emitter 111, therefore, the second light receiver 113 receives smaller reflected light and the light intensity changes are little variation along with distance changes. When the panel assembly 100 is away from the blocking object 70 and the reflected light is small, the light that is emitted by the first light emitter 111 directly enters the first light receiver 112 by an internal reflection and thus, the first light receiver 112 receives a large basic value of the light intensity. Furthermore, since the cover plate assembly 12 is away from the blocking object 70 and the light intensity of the reflected light is smaller, the light intensity changes of the reflected light received by the first light receiver 112 are not obvious. Moreover, since the distance between the second light receiver 113 and the first light emitter 111 is greater than the distance between the first light receiver 112 and the first light emitter 111, light emission of the first light emitter 111 that is reflected into the second light receiver 113 by the internal reflection is smaller, so that a basic value of the light intensity of the second light receiver 113 by the internal reflection is small. Therefore, the light intensity change of the reflected light that enters the second light receiver 113 is relatively large.

In a communication process of the mobile phone, the control circuit 13 controls the first light emitter 111 that emits the detection light, and determines whether the mobile terminal installed with the panel assembly 100 is close to or away from the human face according to the light intensity of the reflected light that are received by the first light receiver 112 and the second light receiver 113. When the determination is that the mobile terminal is away from the human face, the cover plate assembly 12 is controlled and the display screen is turned on. When the determination is that the mobile terminal is close to the human face, the cover plate assembly 12 is controlled and the display screen is turned off.

When the light intensity received by the first light receiver 112 reaches a first proximity threshold, or when the light intensity received by the second light receiver reaches a second proximity threshold, a determination is that the mobile terminal is close to the human face. When the light intensity received by the first light receiver 112 reaches a first distant threshold, and when the light intensity received by the second light receiver 113 reaches a second distant threshold, the determination is that the mobile terminal is away from the human face.

Figure 4:
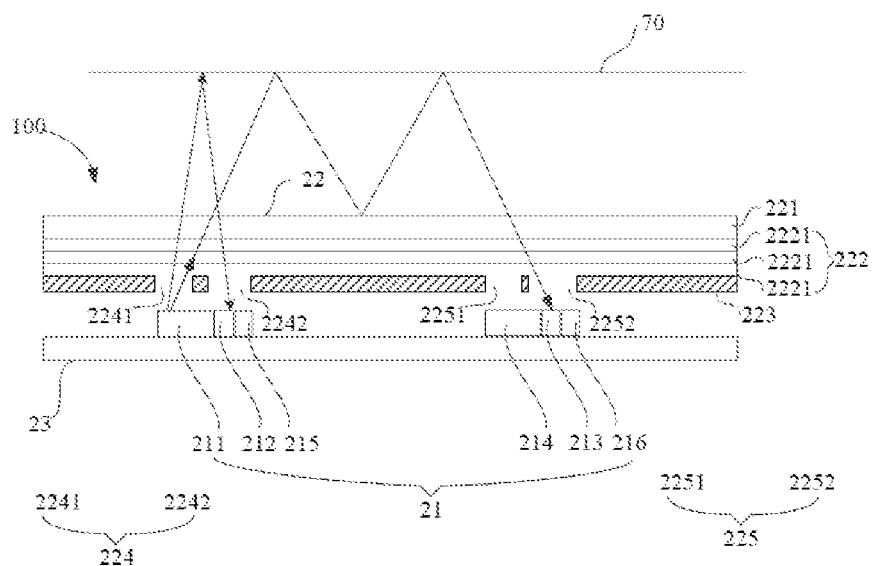
FIG. 4 illustrates a third structural diagram of the panel assembly according to one embodiment of the present disclosure.

FIG. 4 illustrates a third structural diagram of the panel assembly 100 according to one embodiment of the present disclosure. The panel assembly 100 includes a sensor unit 21, a cover plate assembly 22, and a control circuit 23. The sensor unit 21 is arranged on one side of an inner surface of the cover plate assembly 22. The sensor unit 21 and the cover plate assembly 22 are arranged at an interval. The control circuit 23 is in communication with the sensor unit 21 and the cover plate assembly 22. For example, the control circuit 23 is a main circuit board, and the sensor unit 21 is fixedly arranged on the main circuit board.

The sensor unit 21 includes a first light emitter 211, a first light receiver 212, a second light receiver 213, a second light emitter 214, a first ambient brightness sensor 215, and a second ambient brightness sensor 216.

In one embodiment, the sensor unit 21 includes a circuit board. The first light emitter 211, the first light receiver 212, the second light receiver 213, the second light emitter 214, the first ambient brightness sensor 215, and the second ambient brightness sensor 216 are arranged on the circuit board.

In one embodiment, the first light emitter 211 and the second light emitter 214 are used for emitting invisible light (e.g., infrared light) of which the wavelength is greater than 850 nm.

In one embodiment, the first light emitter 211 and the second light emitter 214 are infrared light emitters. The first light receiver 212 and the second light receiver 213 are infrared light receivers. The first light receiver 212 is used for receiving a proximity light signal that is formed by reflecting the detection light off a blocking object. The second light receiver 213 is used for receiving a distant light signal that is formed by reflecting the detection light off the blocking object. A distance between the first light receiver 212 and the first light emitter 211 is less than a distance between the second light receiver 213 and the first light emitter 211. The proximity light signal means that the first light receiver 212 is close to the first light emitter 211, where the first light receiver 212 receives a reflected detection light from the blocking object. The distant light signal means that the second light receiver 213 is away from the first light emitter 211, where the second light receiver 213 receives the reflected detection light from the blocking object.

The distance between the first light receiver 212 and the first light emitter 211 is less than the distance between the second light receiver 213 and the first light emitter 211. Therefore, when the first light emitter 211 serves as a detection light emitter, and when the panel assembly 100 is away from the blocking object, the light intensity change detection of the second light receiver 213 is more sensitive. When the panel assembly 100 is close to the blocking object, the light intensity change detection of the first light receiver 212 is more sensitive. When the second light emitter 214 serves as a detection light emitter, and when the panel assembly 100 is away from the blocking object, the light intensity change detection of the first light receiver 212 is more sensitive. When the panel assembly 100 is close to the blocking object, the light intensity change detection of the second light receiver 213 is more sensitive.

In one embodiment, the control circuit 23 selects one of the first light emitter 211 and the second light emitter 214 as a detection light emitter. Generally, the first light emitter 211 serves as an emitter of the detection light, and when the control circuit 23 detects that the first light emitter 211 is abnormal or damaged, the second light emitter 214 serves as a detection light emitter.

In embodiments, the first light emitter 211, the first light receiver 212 and the first ambient brightness sensor 215 can be integrated into an integrated chip that forms a three-in-one chip. The second light emitter 214, the second light receiver 213, and the second ambient brightness sensor 216 can be integrated into the other integrated chip that forms another three-in-one chip.

Figure 5:
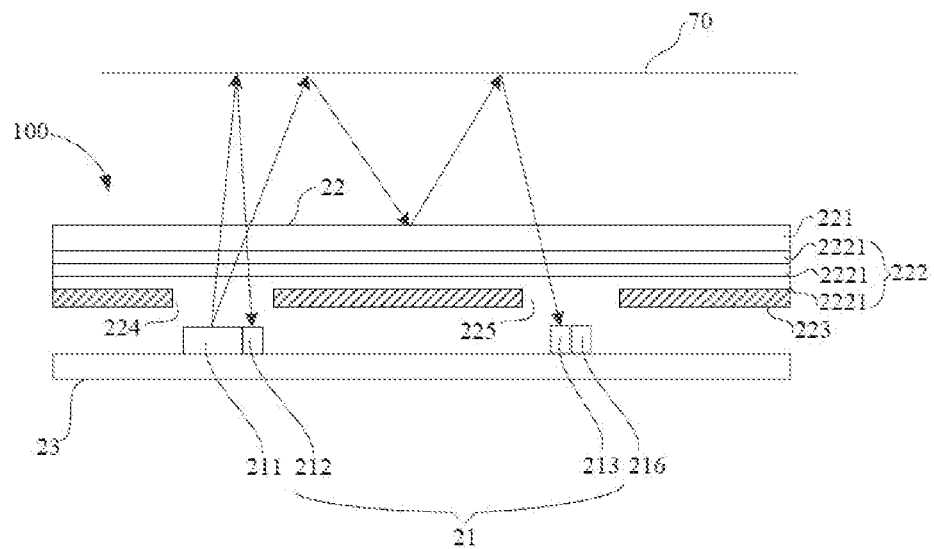
FIG. 5 illustrates a fourth structural diagram of the panel assembly according to one embodiment of the present disclosure.

In embodiments, as shown in FIG. 5, the sensor unit 21 includes a first light emitter 211, a first light receiver 212, a second light receiver 213, and a second ambient brightness sensor 216. The first light emitter 211, the first light receiver 212, the second light receiver 213, and the second ambient brightness sensor 216 are arranged on the circuit board.

In one embodiment, the first light emitter 211 and the first light receiver 212 can be integrated in an integrated chip that forms a two-in-one chip. In another embodiment, the second light receiver 213 and the second ambient brightness sensor 216 can be integrated in another integrated chip that forms another two-in-one chip. The two two-in-one chips are arranged on the circuit board at an interval.

A distance between the two two-in-one chips has a range from 2 millimeters to 12 millimeters. The distance is a length between the geometric centers of the two two-in-one chips.

In one embodiment, the cover plate assembly 22 includes a cover plate 221, a light-transmitting ink layer 222 on an inner surface of the cover plate 221, and a light-shading ink layer 223 that is arranged on a surface of the light-transmitting ink layer 222 and is away from the cover plate 221. The light-transmitting ink layer 222 and the light-shading ink layer 223 form an ink layer.

In one embodiment, the light-transmitting ink layer 222 includes a plurality of light-transmitting ink sub-layers 2221. For example, the light-transmitting ink layer 222 includes three light-transmitting ink sub-layers 2221, where each of the light-transmitting ink sub-layers 2221 is formed by spraying or printing white ink. It should be noted that the light-transmitting ink layer 222 can be designed into other colors according to different aesthetic requirements besides the white ink.

In one embodiment, the light-shading ink layer 223 can be formed by spraying or printing black ink. A first light through-hole 224 and a second light through-hole 225 are formed in the light-shielding ink layer 223.

In one embodiment, the light-transmitting ink layer 22 on the light-shading ink layer 223 is a transparent ink layer. Light transmittance of the ink layer can be set according to different requirements. For example, the transmittance of visible light (e.g., visible light having a wavelength of 550 nm) of the light-transmitting ink layer 222 has a range from 2% to 10%. The transmittance of the light signal (e.g., infrared rays having a wavelength of 850 nm) of a proximity sensor is greater than or equal to 80%.

As shown in FIG. 4, the first light through-hole 224 includes a first light emitting hole 2241 and a first light receiving hole 2242 that separates from the first light emitting hole 2241. The first light emitter 211 is opposite the first light emitting hole 2241, and emits detection light outward through the first light emitting hole 2241. The first light receiver 212 and the first ambient brightness sensor 215 are opposite the first light receiving hole 2242. The first light receiver 212 receives reflected light of the detection light through the first light receiving hole 2242. The first ambient brightness sensor 215 detects ambient light intensity through the first light receiving hole 2242.

As shown in FIG. 4, the second light through-hole 225 includes a second light emitting hole 2251 and a second light receiving hole 2252. The second light emitter 214 is opposite the second light emitting hole 2251, and emits detection light outward through the second light emitting hole 2251. The second light receiver 213 and the second ambient brightness sensor 216 are opposite the second light receiving hole 2252. The second light receiver 213 receives reflected light of the detection light through the second light receiving hole 2252. The second ambient brightness sensor 216 detects ambient light intensity using the second light receiving hole 2252.

Figure 6:
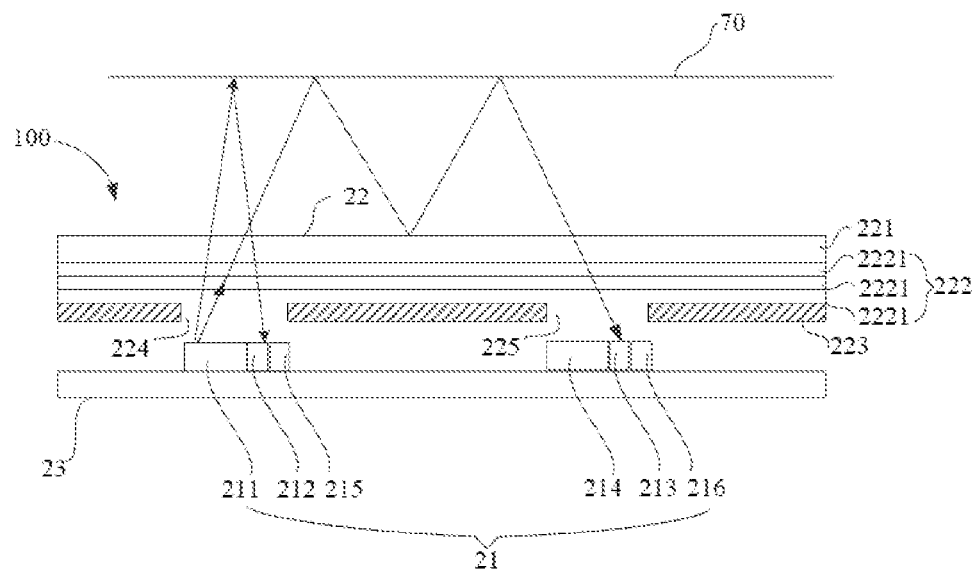
FIG. 6 illustrates a fifth structural diagram of the panel assembly according to one embodiment of the present disclosure.

In one embodiment, as shown in FIG. 6, the first light through-hole 224 is a larger hole, where the larger hole is used by the first light emitter 211, the first light receiver 212, and the first ambient brightness sensor 215.

In one embodiment, the second light through-hole 225 is a larger hole, where the larger hole is used by the second light emitter 214, the second light receiver 213, and the second ambient brightness sensor 216.

For example, when a mobile phone uses the panel assembly 100, the control circuit 23 selects the first light emitter 211 as a detection light emitter, and the second light emitter 214 is in an idle state.

Figure 7:
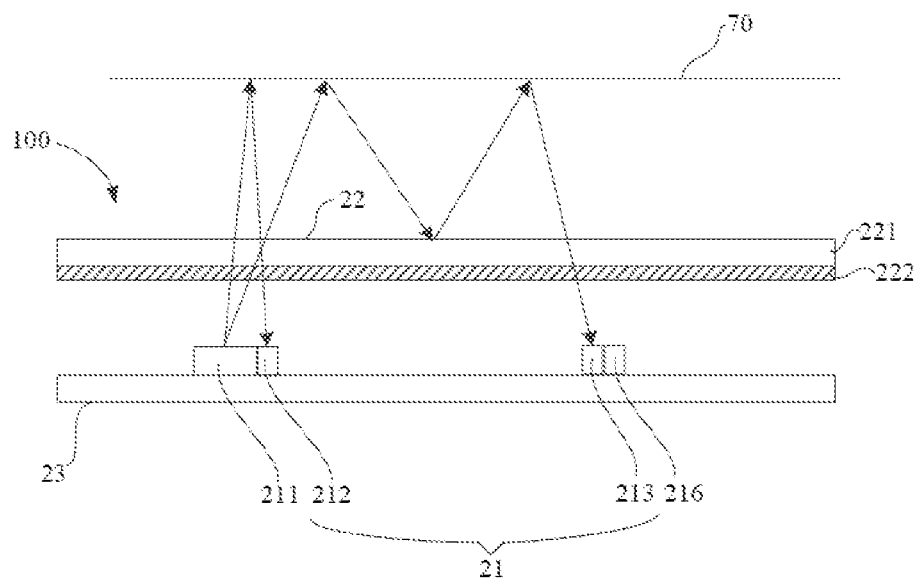
FIG. 7 illustrates a sixth structural diagram of the panel assembly according to one embodiment of the present disclosure.

In one embodiment, as shown in FIG. 7, the cover plate assembly 22 only includes a cover plate 221 and a light-transmitting ink layer 222 arranged on an inner surface of the cover plate 221.

In one embodiment, the light-transmitting ink layer 222 is formed by spraying or printing specific ink. For example, the specific ink can be infrared ink (IR ink). Transmittance of the IR ink to the infrared rays is greater than or equal to 80%, and therefore most infrared rays can pass through the light-transmitting ink layer 222. The appearance of the IR ink is black ink.

A functional region can be formed on a position of the light-transmitting ink layer 222, where the position corresponds to the second ambient brightness sensor 216. An ink that allows the ambient light to be passed through is sprayed or printed on the functional region. The functional region is used for enabling ambient light to be passed, so that the second ambient brightness sensor 216 can detect the ambient brightness.

Figure 8:
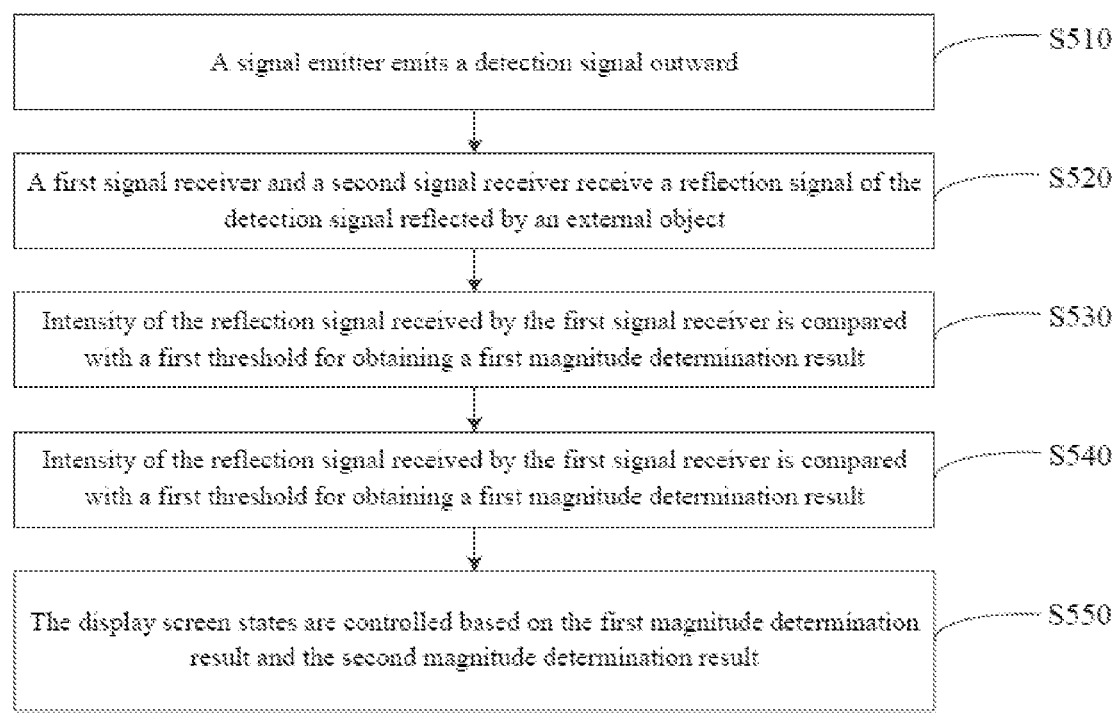
FIG. 8 is a flowchart illustrating a method for controlling display screen statuses according to one embodiment of the present disclosure.

As shown in FIG. 8, a method for controlling display screen statuses includes following action blocks.

At block S510, a signal emitter emits a detection signal outward.

In one embodiment, the terminal controls the signal emitter for emitting the detection signal outward. For example, in a communication process, the terminal is close to the face of a user, and the terminal controls the signal emitter to emit the detection signal outward.

At block S520, a first signal receiver and a second signal receiver receive a reflection signal of the detection signal reflected by an external object.

In one embodiment, when the detection signal emitted by the signal emitter is in contact with the external object, the external object reflects the detection signal to form a reflection signal. The first signal receiver and second signal receiver continuously receive the reflection signal. The first signal receiver is a signal receiver which is close to the signal emitter. The second signal receiver is a signal receiver which is away from the signal emitter.

At block S530, intensity of the reflection signal received by the first signal receiver is compared with a first threshold for obtaining a first magnitude determination result.

At block S540, intensity of the reflection signal received by the second signal receiver is compared with a second threshold for obtaining a second magnitude determination result.

In one embodiment, a first threshold is set in the terminal for the first signal receiver and a second threshold is set in the terminal for the second signal receiver. The first threshold and the second threshold can be signal intensity values. Based on different types of the second signal receiver and first signal receiver, the first threshold and the second threshold can be different.

After the first signal receiver receives the reflection signal, the terminal compares the received reflection signal intensity received by the first signal receiver with the first threshold, so as to determine a magnitude relation between the received reflection signal intensity and the first threshold for generating a first magnitude determination result.

After the second signal receiver receives the reflection signal, the terminal compares the received reflection signal intensity received by the second signal receiver with the second threshold, so as to determine a magnitude relation between the received reflection signal intensity and the second threshold for generating a second magnitude determination result.

At block S550, the display screen statuses are controlled based on the first magnitude determination result and the second magnitude determination result.

The display screen statuses include on and off states of the display screen. When the terminal obtains the first magnitude determination result and the second magnitude determination result, the display screen statuses are controlled based on the first magnitude determination result and the second magnitude determination result.

Figure 9:
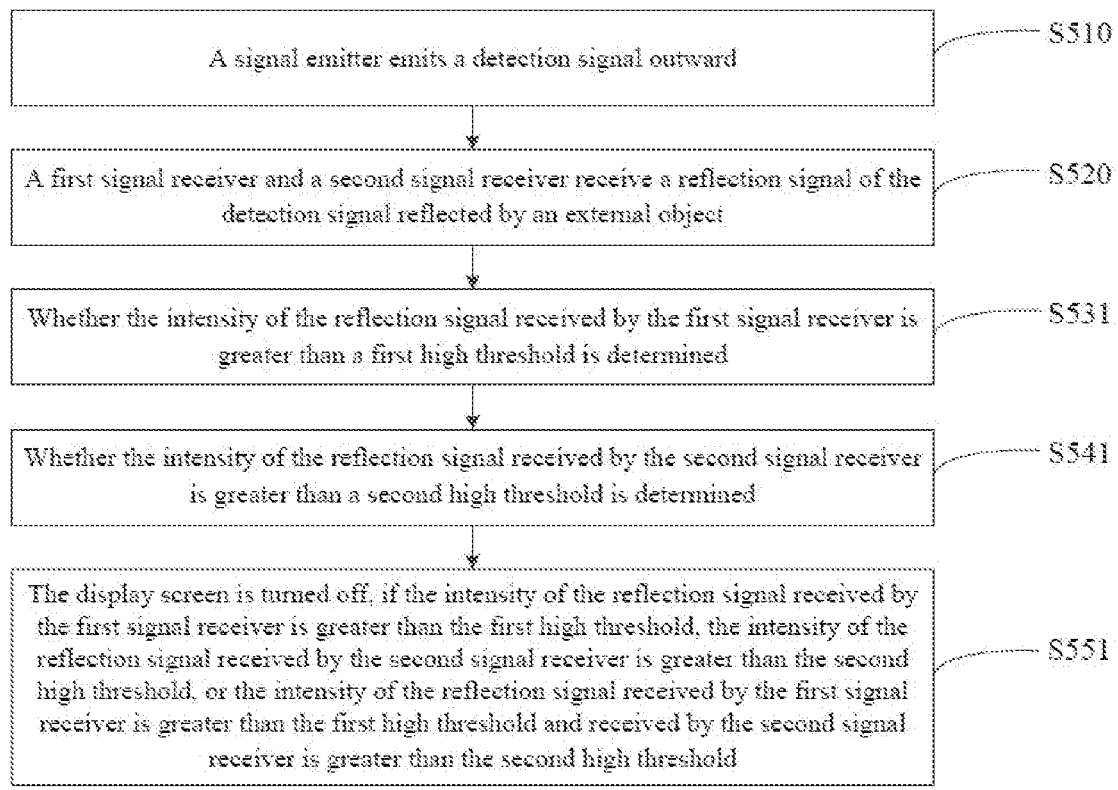
FIG. 9 is a flowchart illustrating a method for controlling display screen statuses according to another embodiment of the present disclosure.

As shown in FIG. 9, in embodiments, a block of comparing intensity of the reflection signal received by the first signal receiver with the first threshold for obtaining the first magnitude determination result includes following actions.

At block S531, whether the intensity of the reflection signal received by the first signal receiver is greater than a first high threshold is determined. The first threshold is a first high threshold that is set by the terminal for the first signal receiver, and is a signal intensity value. For example, when the first signal receiver is a 10-bit receiving chip, the first high threshold is set as 800.

After the first signal receiver receives the reflection signal, the terminal determines whether intensity of the reflection signal is greater than the first high threshold. For example, if the intensity of the reflection signal received by the first signal receiver is 900, the terminal determines that the intensity of the reflection signal 900 received by the first signal receiver is greater than the first high threshold 800.

In embodiments, a block of comparing intensity of the reflection signal received by the first signal receiver with the first threshold for obtaining the first magnitude determination result includes following actions.

At block S541, whether the intensity of the reflection signal received by the second signal receiver is greater than a second high threshold is determined. The second threshold is a second high threshold that is set by the terminal for the second signal receiver, and is a signal intensity value. When the second signal receiver is a 10-bit receiving chip, the second high threshold is set as 50.

After the second signal receiver receives the reflection signal, the terminal determines whether intensity of the reflection signal is greater than the second high threshold. For example, if the intensity of the reflection signal received by the second signal receiver is 80, the terminal determines that the intensity of the reflection signal 80 received by the second signal receiver is greater than the second high threshold 50.

In embodiments, a block of controlling the display screen statuses based on the first magnitude determination result and the second magnitude determination result includes following actions.

At block S551, the display screen is turned off, if the intensity of the reflection signal received by the first signal receiver is greater than the first high threshold, the intensity of the reflection signal received by the second signal receiver is greater than the second high threshold, or the intensity of the reflection signal received by the first signal receiver is greater than the first high threshold and received by the second signal receiver is greater than the second high threshold.

The display screen of the terminal is turned off, when the terminal determines that the intensity of the reflection signal received by the first signal receiver is greater than the first high threshold, the intensity of the reflection signal received by the second signal receiver is greater than the second high threshold, or the intensity of the reflection signal received by the first signal receiver is greater than the first high threshold and received by the second signal receiver is greater than the second high threshold, so that the terminal determines that a distance between the terminal and the external object is in a proximity state.

Figure 10:
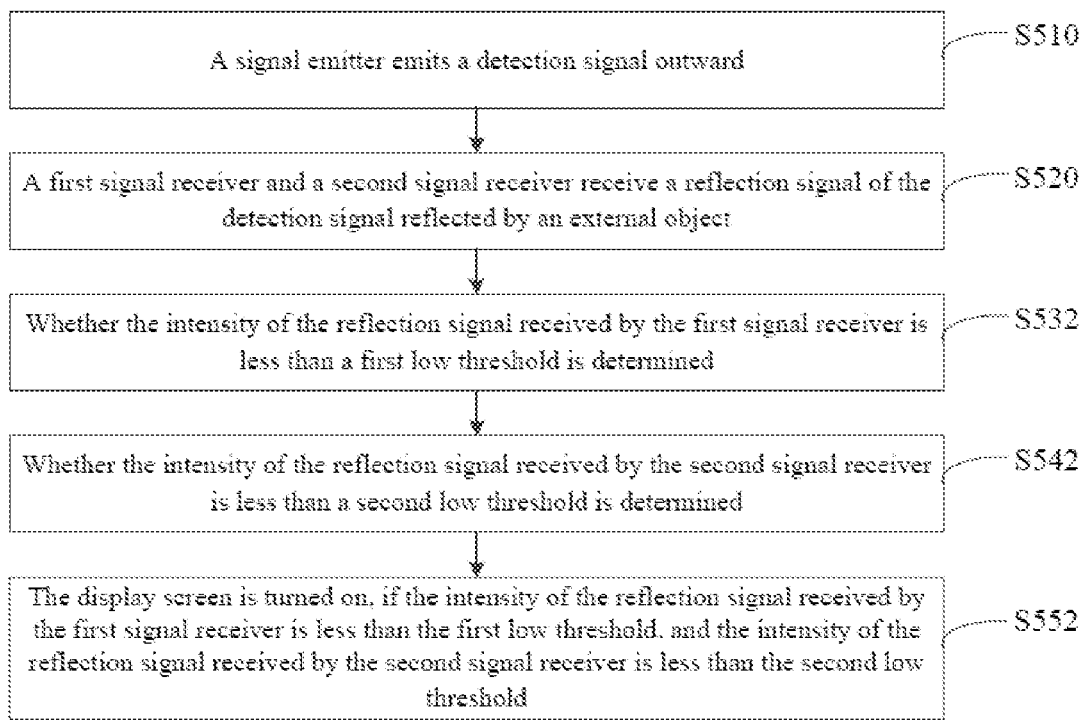
FIG. 10 is a yet another flowchart illustrating a method for controlling display screen statuses according to one embodiment of the present disclosure.

As shown in FIG. 10, in embodiments, a block of comparing intensity of the reflection signal received by the first signal receiver with the first threshold for obtaining the first magnitude determination result further includes following actions.

At block S532, whether the intensity of the reflection signal received by the first signal receiver is less than a first low threshold is determined.

The first threshold is a first low threshold that is set by the terminal for the first signal receiver, and is a signal intensity value. When the first signal receiver is a 10-bit receiving chip, the first low threshold is set as 500.

After the first signal receiver receives the reflection signal, the terminal determines whether intensity of the reflection signal is less than the first low threshold. For example, if the intensity of the reflection signal received by the first signal receiver is 400, the terminal determines that the intensity of the reflection signal 400 received by the first signal receiver is less than the first low threshold 500.

A block of comparing intensity of the reflection signal received by the second signal receiver with the second threshold for obtaining the second magnitude determination result further includes following actions.

At block S542, whether the intensity of the reflection signal received by the second signal receiver is less than a second low threshold is determined.

The second threshold is a second low threshold that is set by the terminal for the second signal receiver, and is a signal intensity value. When the second signal receiver is a 10-bit receiving chip, the second high threshold is set as 20.

After the second signal receiver receives the reflection signal, the terminal determines whether intensity of the reflection signal is less than the second low threshold. For example, if the intensity of the reflection signal received by the second signal receiver is 15, the terminal determines that the intensity of the reflection signal 15 received by the second signal receiver is less than the second low threshold 20.

In embodiments, a block of controlling the display screen statuses based on the first magnitude determination result and the second magnitude determination result further includes following actions.

At block S552, the display screen is turned on, if the intensity of the reflection signal received by the first signal receiver is less than the first low threshold, and the intensity of the reflection signal received by the second signal receiver is less than the second low threshold.

The display screen of the terminal is turned on, if the terminal determines that the intensity of the reflection signal received by the first signal receiver is less than the first low threshold, and the intensity of the reflection signal received by the second signal receiver is less than the second low threshold, so that the terminal determines that a distance between the terminal and the external object is in a distant state.

Figure 11:
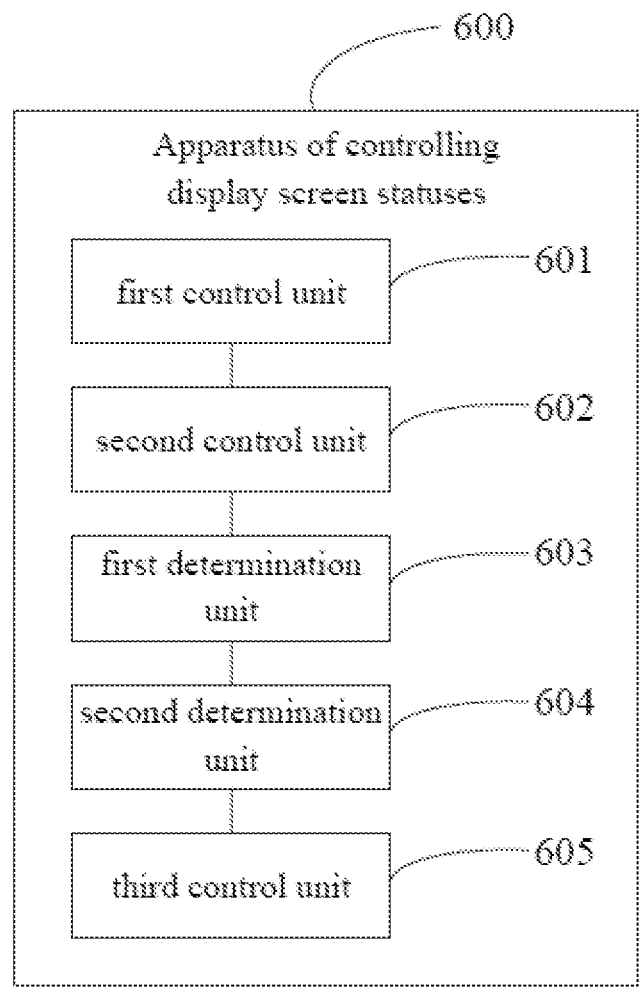
FIG. 11 is a structural diagram illustrating an apparatus for controlling display screen statuses according to one embodiment of the present disclosure.

FIG. 11 is a structural diagram illustrating an apparatus of controlling display screen statuses according to one embodiment of the present disclosure. The apparatus 600 of controlling display screen statuses includes a first control unit 601, a second control unit 602, a first determination unit 603, a second determination unit 604, and a third control unit 605.

The first control unit 601 is configured to control a signal emitter for emitting a detection signal outward.

In one embodiment, the first control unit 601 controls the signal emitter for emitting the detection signal outward. For example, in a communication process, the terminal is close to the face of a user, and the first control unit 601 controls the signal emitter to emit the detection signal outward.

The second control unit 602 is configured to control a first signal receiver and a second signal receiver for receiving a reflection signal of the detection signal reflected by an external object.

In one embodiment, when the detection signal emitted by the signal emitter is in contact with the external object, the external object reflects the detection signal to form a reflection signal. The second control unit 602 controls first signal receiver and second signal receiver for continuously receiving the reflection signal. The first signal receiver is a signal receiver which is close to the signal emitter. The second signal receiver is a signal receiver which is away from the signal emitter.

The first determination unit 603 is configured to compare the intensity of the reflection signal received by the first signal receiver with a first threshold for obtaining a first magnitude determination result.

The second determination unit 604 is configured to compare the intensity of the reflection signal received by the second signal receiver with a second threshold for obtaining a second magnitude determination result.

In one embodiment, a first threshold is set in the terminal for the first signal receiver and a second threshold is set in the terminal for the second signal receiver. The first threshold and the second threshold can be signal intensity values. Based on different types of the second signal receiver and first signal receiver, the first threshold and the second threshold can be different.

After the first signal receiver receives the reflection signal, the first determination unit 603 compares the received reflection signal intensity received by the first signal receiver with the first threshold, so as to determine a magnitude relation between the received reflection signal intensity and the first threshold for generating a first magnitude determination result.

After the second signal receiver receives the reflection signal, the second determination unit 604 compares the received reflection signal intensity received by the second signal receiver with the second threshold, so as to determine a magnitude relation between the received reflection signal intensity and the second threshold for generating a second magnitude determination result.

The third control unit 605 controls the display screen statuses based on the first magnitude determination result and the second magnitude determination result.

The display screen statuses include on and off states of the display screen. When the first determination unit 603 obtains the first magnitude determination result and the second determination unit 604 obtains the second magnitude determination result, the third control unit 605 controls the display screen statuses based on the first magnitude determination result and the second magnitude determination result.

In embodiments, the first determination unit 603 is configured to determine whether the intensity of the reflection signal received by the first signal receiver is greater than a first high threshold. The first threshold is a first high threshold that is set by the terminal for the first signal receiver, and is a signal intensity value. For example, when the first signal receiver is a 10-bit receiving chip, the first high threshold is set as 800.

After the first signal receiver receives the reflection signal, the first determination unit 603 determines whether intensity of the reflection signal is greater than the first high threshold. For example, if the intensity of the reflection signal received by the first signal receiver is 900, the terminal determines that the intensity of the reflection signal 900 received by the first signal receiver is greater than the first high threshold 800.

In embodiments, the second determination unit 604 determines whether the intensity of the reflection signal received by the second signal receiver is greater than a second high threshold. The second threshold is a second high threshold that is set by the terminal for the second signal receiver, and is a signal intensity value. When the second signal receiver is a 10-bit receiving chip, the second high threshold is set as 50.

After the second signal receiver receives the reflection signal, the second determination unit 604 determines whether intensity of the reflection signal is greater than the second high threshold. For example, if the intensity of the reflection signal received by the second signal receiver is 80, the terminal determines that the intensity of the reflection signal 80 received by the second signal receiver is greater than the second high threshold 50.

In embodiments, the third control unit 605 controls the display screen for turning off the display screen, if the intensity of the reflection signal received by the first signal receiver is greater than the first high threshold, the intensity of the reflection signal received by the second signal receiver is greater than the second high threshold, or the intensity of the reflection signal received by the first signal receiver is greater than the first high threshold and received by the second signal receiver is greater than the second high threshold.

The third control unit 605 controls the terminal for turning off the display screen of the terminal, when the first determination unit 603 determines that the intensity of the reflection signal received by the first signal receiver is greater than the first high threshold, or the second determination unit 604 determines that the intensity of the reflection signal received by the second signal receiver is greater than the second high threshold, so that the terminal determines that a distance between the terminal and the external object is in a proximity state.

In embodiments, the first determination unit 603 determines whether the intensity of the reflection signal received by the first signal receiver is less than a first low threshold.

The first threshold is a first low threshold that is set by the terminal for the first signal receiver, and is a signal intensity value. For example, when the first signal receiver is a 10-bit receiving chip, the first low threshold is set as 500.

After the first signal receiver receives the reflection signal, the first determination unit 603 determines whether intensity of the reflection signal is less than the first low threshold. For example, if the intensity of the reflection signal received by the first signal receiver is 400, the first determination unit 603 determines that the intensity of the reflection signal 400 received by the first signal receiver is less than the first low threshold 500.

In embodiments, the second determination unit 604 determines whether the intensity of the reflection signal received by the second signal receiver is less than a second low threshold.

The second threshold is a second low threshold that is set by the terminal for the second signal receiver, and is a signal intensity value. For example, when the second signal receiver is a 10-bit receiving chip, the second high threshold is set as 20.

After the second signal receiver receives the reflection signal, the second determination unit 604 determines whether intensity of the reflection signal is less than the second low threshold. For example, if the intensity of the reflection signal received by the second signal receiver is 15, the second determination unit 604 determines that the intensity of the reflection signal 15 received by the second signal receiver is less than the second low threshold 20.

The third control unit 605 controls the terminal for turning on the display screen of the terminal, if the intensity of the reflection signal received by the first signal receiver is less than the first low threshold, and the intensity of the reflection signal received by the second signal receiver is less than the second low threshold.

In embodiments, the third control unit 605 controls the terminal for turning on the display screen of the terminal, when the first determination unit 603 determines that the intensity of the reflection signal received by the first signal receiver is less than the first low threshold, and the second determination unit 604 determines that the intensity of the reflection signal received by the second signal receiver is less than the second low threshold, so that the third control unit 605 determines that a distance between the terminal and the external object is in a distant state.

Figure 12:
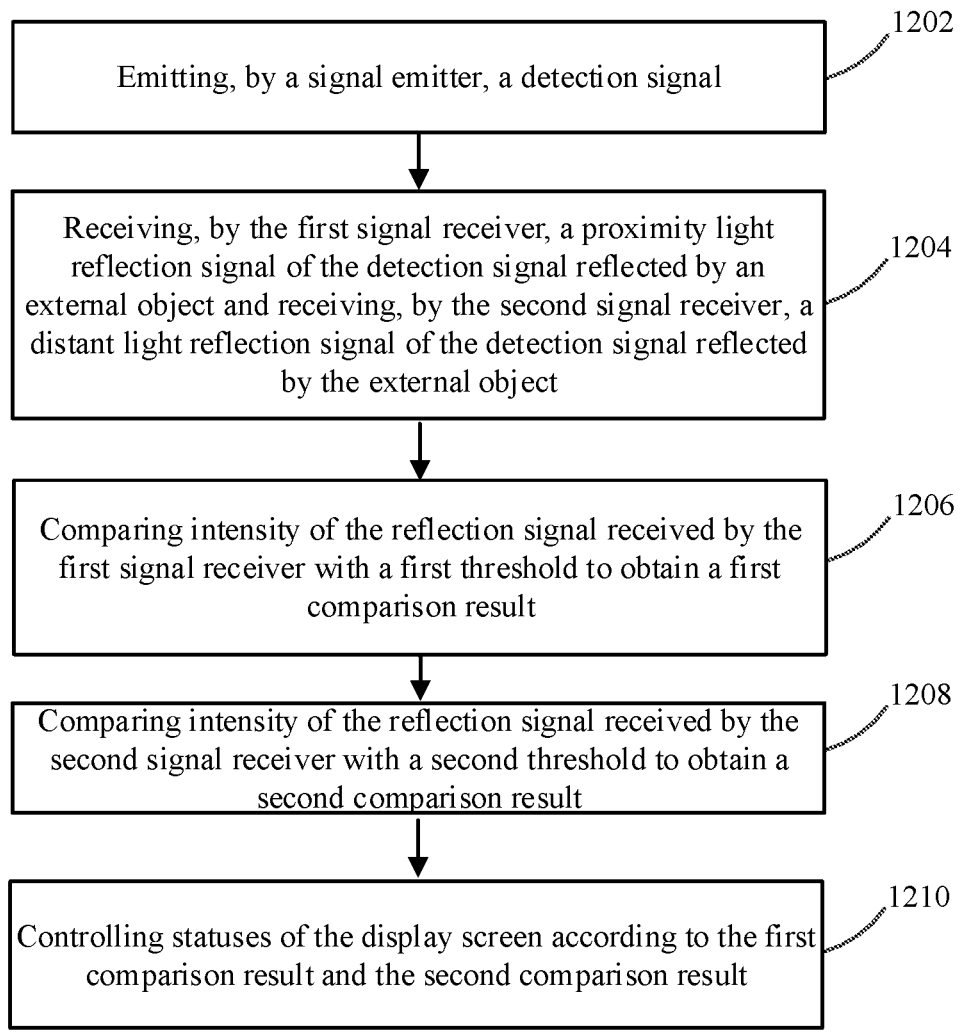
FIG. 12 is a structural diagram illustrating a method for controlling display screen statuses according to an embodiment of the present disclosure.

FIG. 12 is a structural diagram illustrating a method for controlling display screen statuses according to an embodiment of the present disclosure. The method is applicable to a terminal including a display screen, a signal emitter, a first signal receiver, and a second signal receiver. A distance between the second signal receiver and the signal emitter is greater than that between the first signal receiver and the signal emitter As illustrated in FIG. 12, the method begins at block 1202.

At block 1202, a detection signal is emitted by the signal emitter.

At block 1204, a proximity light reflection signal of the detection signal reflected by an external object is received by the first signal receiver and a distant light reflection signal of the detection signal reflected by the external object is received by the second signal receiver.

At block 1206, intensity of the reflection signal received by the first signal receiver is compared with a first threshold to obtain a first comparison result.

At block 1208, intensity of the reflection signal received by the second signal receiver is compared with a second threshold to obtain a second comparison result.

At block 1210, control statuses of the display screen according to the first comparison result and the second comparison result.

In one embodiment, the intensity of the reflection signal received by the first signal receiver is compared with the first threshold to obtain the first comparison result as follows. Determine whether the intensity of the reflection signal received by the first signal receiver is higher than a first high threshold. In one embodiment, the intensity of the reflection signal received by the second signal receiver is compared with the second threshold to obtain the second comparison result as follows. Determine whether the intensity of the reflection signal received by the second signal receiver is higher than a second high threshold.

In one embodiment, control the statuses of the display screen according to the first comparison result and the second comparison result as follows. Turn off the display screen, based on a determination that the intensity of the reflection signal received by the first signal receiver is higher than the first high threshold, the intensity of the reflection signal received by the second signal receiver is higher than the second high threshold, or the intensity of the reflection signal received by the first signal receiver is higher than the first high threshold and the intensity of the reflection signal received by the second signal receiver is higher than the second high threshold.

In one embodiment, the intensity of the reflection signal received by the first signal receiver is compared with the first threshold to obtain the first comparison result as follows. Determine intensity of the reflection signal received by the first signal receiver with the first threshold to obtain the first comparison result. In one embodiment, the intensity of the reflection signal received by the second signal receiver is compared with the second threshold to obtain the second comparison result as follows. Determine whether the intensity of the reflection signal received by the second signal receiver is lower than a second low threshold.

In one embodiment, control the statuses of the display screen according to the first comparison result and the second comparison result as follows. Turn on the display screen, based on a determination that the intensity of the reflection signal received by the first signal receiver is lower than the first low threshold and the intensity of the reflection signal received by the second signal receiver is lower than the second low threshold.

Figure 13:
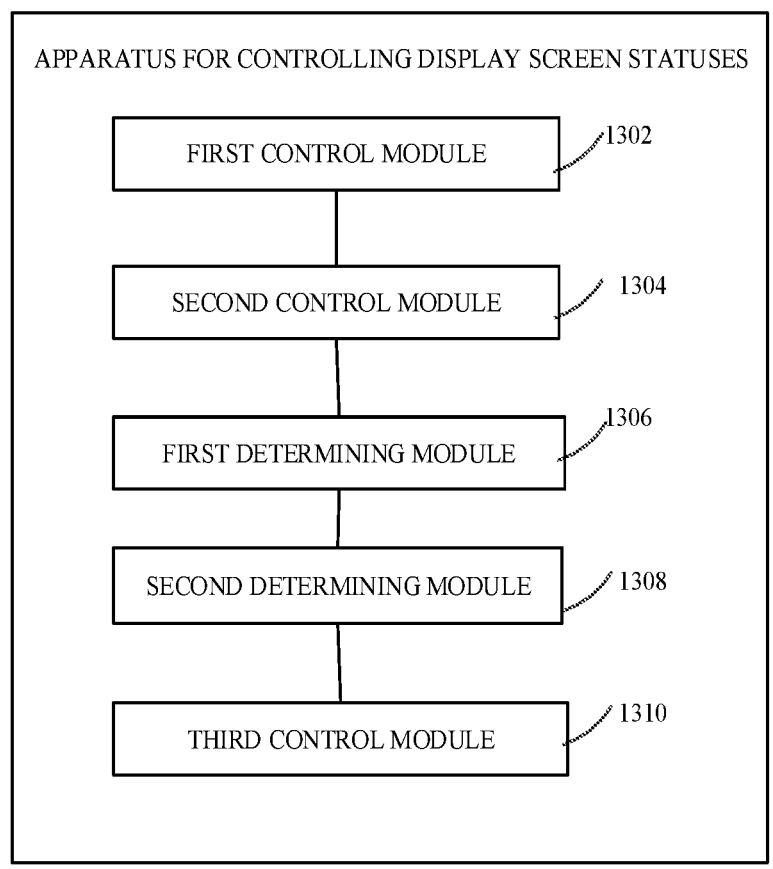
FIG. 13 is a structural diagram illustrating an apparatus for controlling display screen statuses according to an embodiment of the present disclosure.

FIG. 13 is structural diagram illustrating an apparatus for controlling display screen statuses according to an embodiment of the present disclosure. The apparatus is applicable to a terminal including a display screen, a signal emitter, a first signal receiver, and a second signal receiver. A distance between the second signal receiver and the signal emitter is greater than that between the first signal receiver and the signal emitter. As illustrated in FIG. 13. The apparatus includes a first control module 1302, a second control module 1304, a first determining module 1306, a second determining module 1308, and a third control module 1310.

The first control module 1302 is configured to control the signal emitter to emit a detection signal. The second control module 1304 is configured to control the first signal receiver to receive a proximity light reflection signal of the detection signal reflected by an external object and to control the second signal receiver to receive a distant light reflection signal of the detection signal reflected by the external object. The first determining module 1306 is configured to compare intensity of the reflection signal received by the first signal receiver with a first threshold to obtain a first comparison result. The second determining module 1308 is configured to compare intensity of the reflection signal received by the second signal receiver with a second threshold to obtain a second comparison result. The third control module 1310 is configured to control statuses of the display screen according to the first comparison result and the second comparison result.

In one embodiment, the first determining module 1306 is configured to determine whether the intensity of the reflection signal received by the first signal receiver is higher than a first high threshold. In one embodiment, the second determining module 1308 is configured to determine whether the intensity of the reflection signal received by the second signal receiver is higher than a second high threshold.

In one embodiment, the third control module 1310 is configured to turn off the display screen, when the first determining module 1306 determines that the intensity of the reflection signal received by the first signal receiver is higher than the first high threshold, the second determining module 1308 determines that the intensity of the reflection signal received by the second signal receiver is higher than the second high threshold, or the first determining module 1306 determines that the intensity of the reflection signal received by the first signal receiver is higher than the first high threshold and the second determining module 1308 determines that the intensity of the reflection signal received by the second signal receiver is higher than the second high threshold.

In one embodiment, the first determining module 1306 is configured to determine whether the intensity of the reflection signal received by the first signal receiver is lower than a first low threshold. In one embodiment, the second determining module 1308 is configured to determine whether the intensity of the reflection signal received by the second signal receiver is lower than a second low threshold.

In one embodiment, the third control module 1310 is configured to turn on the display screen, when the first determining module determines that the intensity of the reflection signal received by the first signal receiver is lower than the first low threshold and the second determining module determines that the intensity of the reflection signal received by the second signal receiver is lower than the second low threshold.

Embodiments of the disclosure also provide a terminal. The terminal includes a display screen, a signal emitter, a first signal receiver, and a second signal receiver. A distance between the second signal receiver and the signal emitter is greater than that between the first signal receiver and the signal emitter. The terminal is configured to perform all or part of the operations of any of the methods described in the foregoing method embodiments.

In the description of the present disclosure, reference is made to the term "one embodiment", "certain embodiments", "example embodiments", "some embodiments", "examples", "specific examples", or "some examples" and the like, and are intended to refer to specific features described in connection with the embodiments or examples, structure, material or characteristic that is included in at least one embodiment or example of the present disclosure. In the present disclosure, the schematic expressions of the terms are not necessarily referring to the same embodiment or example. Moreover, the described specific features, structures, materials, or features may be combined in any suitable manner in any one or more embodiments or examples of the present disclosure. The actions of the method disclosed by the embodiments of present disclosure can be embodied directly as a hardware decoding processor can be directly executed by a hardware decoding processor, or by combinations of hardware and software codes in a decoding processor. The software codes can be stored in a storage medium selected from a group consisting of random access memory, a flash memory, a read-only memory, a programmable read-only memory, an electrically erasable programmable memory, and registers. The processor read information (e.g., instructions) in the memory and completes the above-mentioned actions of the method in combination with hardware.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A method for controlling display screen statuses, being applicable to a terminal comprising a display screen, a first signal emitter, a second signal emitter, a first signal receiver, a second signal receiver, a first ambient brightness sensor, a second ambient brightness sensor, a first light through-hole, and a second light through-hole, wherein a distance between the second signal receiver and the first signal emitter is different from that between the first signal receiver and the first signal emitter, a distance between the second signal receiver and the second signal emitter is different from that between the first signal receiver and the second signal emitter, wherein the first light through-hole is used by the first signal emitter, the first signal receiver, and the first ambient brightness sensor, wherein the second light through-hole is used by the second signal emitter, the second signal receiver, and the second ambient brightness sensor, the method comprising:
  detecting, via a control circuit of the terminal, whether the first signal emitter is able to emit a detection signal;
  emitting, by the first signal emitter, the detection signal when the control circuit detects that the first signal emitter is able to emit the detection signal;
  emitting, by the second signal emitter, the detection signal when the control circuit detects that the first signal emitter is unable to emit the detection signal;
  receiving, by the first signal receiver, a proximity light reflection signal of the detection signal reflected by an external object and receiving, by the second signal receiver, a distant light reflection signal of the detection signal reflected by the external object;
  comparing intensity of the reflection signal received by the first signal receiver with a first threshold to obtain a first comparison result;
  comparing intensity of the reflection signal received by the second signal receiver with a second threshold to obtain a second comparison result; and
  controlling statuses of the display screen according to the first comparison result and the second comparison result.

2. The method of claim 1, wherein
comparing the intensity of the reflection signal received by the first signal receiver with the first threshold to obtain the first comparison result comprises:
  determining whether the intensity of the reflection signal received by the first signal receiver is higher than a first high threshold; and
comparing the intensity of the reflection signal received by the second signal receiver with the second threshold to obtain the second comparison result comprises:
  determining whether the intensity of the reflection signal received by the second signal receiver is higher than a second high threshold.

3. The method of claim 2, wherein controlling the statuses of the display screen according to the first comparison result and the second comparison result comprises:
  turning off the display screen, based on a determination that the intensity of the reflection signal received by the first signal receiver is higher than the first high threshold, the intensity of the reflection signal received by the second signal receiver is higher than the second high threshold, or the intensity of the reflection signal received by the first signal receiver is higher than the first high threshold and the intensity of the reflection signal received by the second signal receiver is higher than the second high threshold.

4. The method of claim 1, wherein
comparing the intensity of the reflection signal received by the first signal receiver with the first threshold to obtain the first comparison result comprises:
  determining whether the intensity of the reflection signal received by the first signal receiver is lower than a first low threshold; and
comparing the intensity of the reflection signal received by the second signal receiver with the second threshold to obtain the second comparison result comprises:
  determining whether the intensity of the reflection signal received by the second signal receiver is lower than a second low threshold.

5. The method of claim 4, wherein controlling the statuses of the display screen according to the first comparison result and the second comparison result comprises:
  turning on the display screen, based on a determination that the intensity of the reflection signal received by the first signal receiver is lower than the first low threshold and the intensity of the reflection signal received by the second signal receiver is lower than the second low threshold.

6. The method of claim 1, wherein the first signal emitter, the first signal receiver, and the first ambient brightness sensor are integrated into an integrated chip that forms a three-in-one chip, and the second signal emitter, the second signal receiver, and the second ambient brightness sensor are integrated into the other integrated chip that forms another three-in-one chip.

7. An apparatus for controlling display screen statuses, being applicable to a terminal comprising a display screen, a control circuit, a first signal emitter, a second signal emitter, a first signal receiver, a second signal receiver, a first ambient brightness sensor, a second ambient brightness sensor, a first light through-hole, and a second light through-hole, wherein a distance between the second signal receiver and the first signal emitter is that between the first signal receiver and the first signal emitter, a distance between the second signal receiver and the second signal emitter is different from that between the first signal receiver and the second signal emitter, wherein the first light through-hole is used by the first signal emitter, the first signal receiver, and the first ambient brightness sensor, wherein the second light through-hole is used by the second signal emitter, the second signal receiver, and the second ambient brightness sensor, the control circuit is configured to detect whether the first signal emitter is able to emit a detection signal, the apparatus comprising:
- a first control module, configured to control the first signal emitter to emit the detection signal when the control circuit detects that the first signal emitter is able to emit the detection signal and configured to control the second signal emitter to emit the detection signal when the control circuit detects that the first signal emitter is unable to emit the detection signal;
- a second control module, configured to control the first signal receiver to receive a proximity light reflection signal of the detection signal reflected by an external object and to control the second signal receiver to receive a distant light reflection signal of the detection signal reflected by the external object;
- a first determining module, configured to compare intensity of the reflection signal received by the first signal receiver with a first threshold to obtain a first comparison result;
- a second determining module, configured to compare intensity of the reflection signal received by the second signal receiver with a second threshold to obtain a second comparison result; and
- a third control module, configured to control statuses of the display screen according to the first comparison result and the second comparison result.

8. The apparatus of claim 7, wherein
the first determining module is configured to:
- determine whether the intensity of the reflection signal received by the first signal receiver is higher than a first high threshold; and the second determining module is configured to:
- determine whether the intensity of the reflection signal received by the second signal receiver is higher than a second high threshold.

9. The apparatus of claim 8, wherein the third control module is configured to:
- turn off the display screen, when the first determining module determines that the intensity of the reflection signal received by the first signal receiver is higher than the first high threshold, the second determining module determines that the intensity of the reflection signal received by the second signal receiver is higher than the second high threshold, or the first determining module determines that the intensity of the reflection signal received by the first signal receiver is higher than the first high threshold and the second determining module determines that the intensity of the reflection signal received by the second signal receiver is higher than the second high threshold.

10. The apparatus of claim 7, wherein
the first determining module is configured to:
- determine whether the intensity of the reflection signal received by the first signal receiver is lower than a first low threshold; and the second determining module is configured to:
- determine whether the intensity of the reflection signal received by the second signal receiver is lower than a second low threshold.

11. The apparatus of claim 10, wherein the third control module is configured to:
- turn on the display screen, when the first determining module determines that the intensity of the reflection signal received by the first signal receiver is lower than the first low threshold and the second determining module determines that the intensity of the reflection signal received by the second signal receiver is lower than the second low threshold.

12. The apparatus of claim 7, wherein the first signal emitter, the first signal receiver, and the first ambient brightness sensor are integrated into an integrated chip that forms a three-in-one chip, and the second signal emitter, the second signal receiver, and the second ambient brightness sensor are integrated into the other integrated chip that forms another three-in-one chip.

13. A terminal, comprising a display screen, a first signal emitter, a second signal emitter, a first signal receiver, a second signal receiver, a first ambient brightness sensor, a second ambient brightness sensor, a first light through-hole, and a second light through-hole, wherein a distance between the second signal receiver and the first signal emitter is greater than different from that between the first signal receiver and the first signal emitter, a distance between the second signal receiver and the second signal emitter is different from that between the first signal receiver and the second signal emitter, wherein the first light through-hole is used by the first signal emitter, the first signal receiver, and the first ambient brightness sensor, wherein the second light through-hole is used by the second signal emitter, the second signal receiver, and the second ambient brightness sensor, and the terminal is configured to:
- detect, via a control circuit of the terminal, whether the first signal emitter is able to emit a detection signal;
- emit, by the first signal emitter, the detection signal when the control circuit detects that the first signal emitter is able to emit the detection signal;
- emit, by the second signal emitter, the detection signal when the control circuit detects that the first signal emitter is unable to emit the detection signal;
- receive, by the first signal receiver, a proximity light reflection signal of the detection signal reflected by an external object and receive, by the second signal receiver, a distant light reflection signal of the detection signal reflected by the external object;
- compare intensity of the reflection signal received by the first signal receiver with a first threshold to obtain a first comparison result;
- compare intensity of the reflection signal received by the second signal receiver with a second threshold to obtain a second comparison result; and
- control statuses of the display screen according to the first comparison result and the second comparison result.

14. The terminal of claim 13, wherein
the terminal configured to compare the intensity of the reflection signal received by the first signal receiver with the first threshold to obtain the first comparison result is configured to determine whether the intensity of the reflection signal received by the first signal receiver is higher than a first high threshold; and
the terminal configured to compare the intensity of the reflection signal received by the second signal receiver with the second threshold to obtain the second comparison result is configured to determine whether the intensity of the reflection signal received by the second signal receiver is higher than a second high threshold.

15. The terminal of claim 14, wherein the terminal configured to control the statuses of the display screen according to the first comparison result and the second comparison result is configured to:
turn off the display screen, based on a determination that the intensity of the reflection signal received by the first signal receiver is higher than the first high threshold, the intensity of the reflection signal received by the second signal receiver is higher than the second high threshold, or the intensity of the reflection signal received by the first signal receiver is higher than the first high threshold and the intensity of the reflection signal received by the second signal receiver is higher than the second high threshold.

16. The terminal of claim 13, wherein
the terminal configured to compare the intensity of the reflection signal received by the first signal receiver with the first threshold to obtain the first comparison result is configured to determine whether the intensity of the reflection signal received by the first signal receiver is lower than a first low threshold; and
the terminal configured to compare the intensity of the reflection signal received by the second signal receiver with the second threshold to obtain the second comparison result is configured to determine whether the intensity of the reflection signal received by the second signal receiver is lower than a second low threshold.

17. The terminal of claim 16, wherein the terminal configured to control the statuses of the display screen according to the first comparison result and the second comparison result is configured to:
turn on the display screen, based on a determination that the intensity of the reflection signal received by the first signal receiver is lower than the first low threshold and the intensity of the reflection signal received by the second signal receiver is lower than the second low threshold.

18. The terminal of claim 13, wherein the first signal emitter, the first signal receiver, and the first ambient brightness sensor are integrated into an integrated chip that forms a three-in-one chip, and the second signal emitter, the second signal receiver, and the second ambient brightness sensor are integrated into the other integrated chip that forms another three-in-one chip.

\* \* \* \* \*